(12) United States Patent
Kotoff, Jr.

(10) Patent No.: US 11,001,415 B1
(45) Date of Patent: May 11, 2021

(54) TEMPORARY PLUG APPARATUS FOR A PORT OF A MANIFOLD OF A POOL FILTER SYSTEM

(71) Applicant: Alex Kotoff, Jr., Whittier, CA (US)

(72) Inventor: Alex Kotoff, Jr., Whittier, CA (US)

( * ) Notice: Subject to any disclaimer, the term of this patent is extended or adjusted under 35 U.S.C. 154(b) by 245 days.

(21) Appl. No.: 16/362,920

(22) Filed: Mar. 25, 2019

(51) Int. Cl.
*B65D 39/00* (2006.01)
*B01D 29/11* (2006.01)
*E04H 4/12* (2006.01)

(52) U.S. Cl.
CPC .......... *B65D 39/007* (2013.01); *B01D 29/114* (2013.01); *E04H 4/1245* (2013.01)

(58) Field of Classification Search
CPC .... B65D 39/007; E04H 4/1245; B01D 29/114
USPC ....... 220/315–324, 375, 751, 752, 758, 759, 220/916; 215/306
See application file for complete search history.

(56) References Cited

U.S. PATENT DOCUMENTS

| | | | | |
|---|---|---|---|---|
| 2,738,114 A * | 3/1956 | Kahlan | ............... | A47J 41/0083 294/137 |
| 3,137,423 A * | 6/1964 | Tupper | .................. | A47J 45/075 294/137 |
| 3,144,152 A * | 8/1964 | Kopp | ...................... | A47J 47/04 215/6 |
| 4,943,017 A * | 7/1990 | Ennis | .................... | A61J 9/0623 215/11.1 |
| 5,992,678 A * | 11/1999 | Willey | .................. | B65D 23/12 220/735 |
| 6,102,301 A * | 8/2000 | Tiedemann | ............... | A61L 9/12 220/916 |
| 6,105,812 A * | 8/2000 | Riordan | .................. | B65D 1/04 215/6 |
| 10,889,437 B1 * | 1/2021 | Altadonna, Jr. | ...... | B65F 1/1615 |

* cited by examiner

*Primary Examiner* — James N Smalley
(74) *Attorney, Agent, or Firm* — Plager Schack LLP

(57) ABSTRACT

A temporary plug apparatus for use to seal a port in an upper manifold or lower manifold corresponding to a damaged filter grid in a pool filter system is provided. The plug apparatus includes a main body having a central body, an upper tubular member designed to insert into one of a plurality of ports in the upper manifold and a lower tubular member designed to insert into one of a plurality of ports in the lower manifold, and an elastic band coupled to the main body and designed to wrap around the upper manifold or lower manifold of the pool filter system to ensure the upper tubular member or lower tubular member of the main body is secured to the one of the plurality of ports in the upper or lower manifold.

8 Claims, 4 Drawing Sheets

TEMPORARY PLUG APPARATUS FOR A PORT OF A MANIFOLD OF A POOL FILTER SYSTEM

BACKGROUND

The embodiments herein relate generally to pool filter systems. More specifically, embodiments of the invention are directed to a temporary plug apparatus designed to seal any port in the upper or lower manifold corresponding to a damaged filter grid in a pool filter system.

A swimming pool commonly uses a filter system to prevent dirt and debris from entering the basin with water. One common type of pool filter system used in a wide range of applications includes a top or bottom style Diatomaceous Earth (DE) pool and spa filter assembly. In this filter assembly, a filter container houses filter grids that are operably connected to an upper manifold or lower manifold. Each manifold in the upper manifold and lower manifold comprises a plurality of ports that correspond to the filter grids in the container. An intake connects the water in the basin of the swimming pool to the filter container and is operably connected to at least one pump.

During the operation of the pool filter system, the pump sends water from the swimming pool to the filter container via the intake. The captured water passes through the filter grids in the container to collect any dirt, debris and the like in the water. The resulting filtered pool water flows through the corresponding ports in the upper manifold or lower manifold and is sent back into the basin of the swimming pool.

During the normal course of operation of the filter system, the filter grids in the container are subject to wear and/or damage. This is problematic since a damaged filter grid is no longer effective in capturing dirt or debris in the passing pool water. In this scenario, the debris and dirt in the captured pool water passes through the damaged filter grid, flows through the port in the upper or lower manifold corresponding to the damaged filter grid, and is sent back to the basin of the swimming pool.

In certain circumstances, there is a delay in replacing the one or more damaged filter grids in the pool filter system for a variety of reasons including, but not limited to, the time to order, ship and/or obtain a replacement filter grid, the unavailability of pool maintenance personnel, and the like. As such, there is a need in the industry for a temporary plug apparatus that seals any port in an upper manifold or lower manifold of a pool filter system corresponding to a damaged filter grid. This allows the pool filter system to continue operation until the damaged filter grid can be replaced while preventing debris, dirt and/or other items present within the filter container from flowing back into the swimming pool basin.

SUMMARY

In certain embodiments, a temporary plug apparatus for use with an upper manifold or lower manifold of a pool filter system is provided. The plug apparatus is configured to seal a port in the upper or lower manifold corresponding to a damaged filter grid in a plurality of filter grids in the pool filter system to permit continued operation of the filter system until the damaged filter grid is replaced. The plug apparatus comprises a main body comprising a central body, an upper generally tubular member coupled to the central body, and a generally lower tubular member coupled to the central body, the upper generally tubular member configured to insert into one of a plurality of ports in the upper manifold, the lower generally tubular member configured to insert into one of a plurality of ports in the lower manifold, and an elastic band coupled to the central body of the main body to form a loop in the band; wherein the band is configured to stretch to allow the loop to wrap around the upper manifold or lower manifold of the pool filter system to ensure the upper tubular member or lower tubular member of the main body is secured to the one of the plurality of ports in the upper or lower manifold.

In an alternative embodiment, the elastic band comprises a first end with a first ring disposed around the central body of the main body and a second end with a second ring, wherein the band is configured to stretch to wrap around the upper manifold or lower manifold of the pool filter system and allow the second ring of the band to dispose around any portion of the main body.

In an alternative embodiment, the elastic band extends therethrough the central body of the main body so that a first end and a second end of the elastic band remain outside the main body, wherein the band is configured to stretch to wrap around the upper manifold or lower manifold of the pool filter system to allow the first and second ends of the elastic band to couple together by a fastener.

BRIEF DESCRIPTION OF THE FIGURES

The detailed description of some embodiments of the invention will be made below with reference to the accompanying figures, wherein the figures disclose one or more embodiments of the present invention.

DETAILED DESCRIPTION OF CERTAIN EMBODIMENTS

Figure 1:
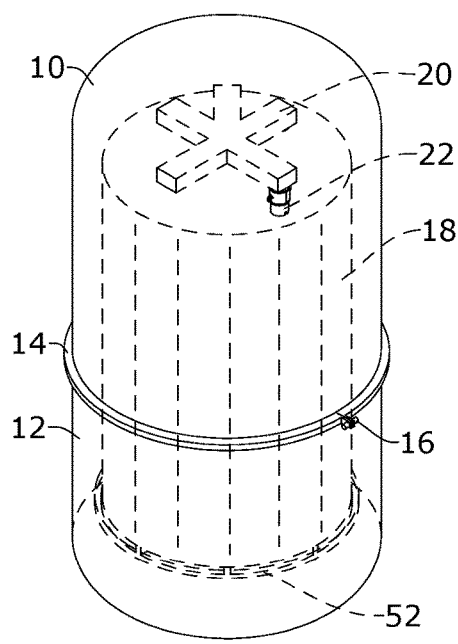
FIG. 1 depicts a perspective view of certain embodiments of the plug apparatus shown in use.

In certain embodiments of the invention as depicted in FIGS. 1-3 and 7, plug apparatus 22 is a temporary solution to seal any manifold port 36 in upper manifold 20 or lower manifold 46 corresponding to a damaged filter grid in filter grids 18 of a pool filter system. In one embodiment, the pool filter system is preferably a Diatomaceous Earth (DE) pool and spa filter assembly that is connected to a basin of a swimming pool. However, alternative types of pool filter systems can be used.

In certain embodiments, the pool filter system comprises upper water filter container 10, lower water filter container 12, filter grids 18, upper manifold 20 and/or lower manifold 46. Upper water filter container 10 is connected to lower water filter container 12 and is secured in place by locking ring 14 and locking pin 16. Filter grids 18 are disposed on lower support ring 52 and are housed within upper and lower water filter containers 10, 12.

In one embodiment, filter grids 18 are arranged in a spiral pattern within upper and lower water filter containers 10, 12. Each filter grid 18 corresponds to a single manifold port 36 in the plurality of manifold ports 36 located on upper manifold 20 or a single manifold port 50 in the plurality of manifold ports 50 located on lower manifold 46. In one embodiment, an intake allows the water in the swimming pool basin to flow to the interior of upper and lower water filter containers 10, 12 with the aid of a pump (not shown).

Figure 2:
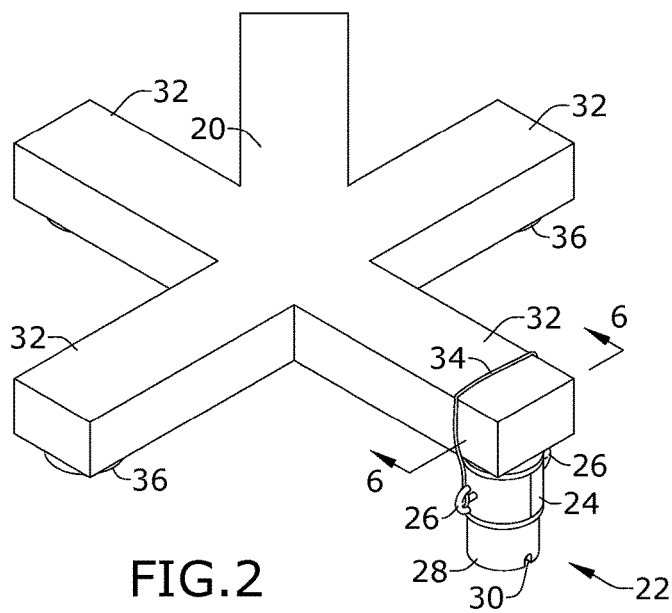
FIG. 2 depicts a perspective view of certain embodiments of the plug apparatus shown in use on the upper manifold of the pool filter system.
Figure 3:
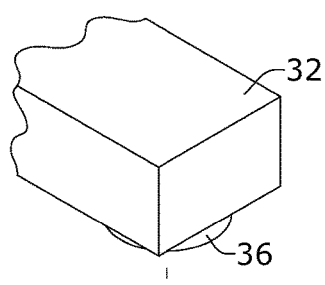
FIG. 3 depicts an exploded view of certain embodiments of the plug apparatus.
Figure 3:
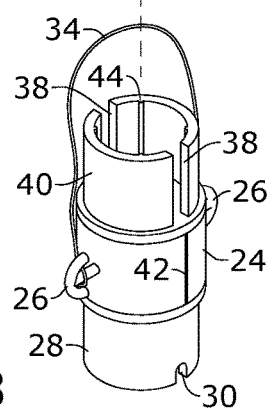
Figure 4:
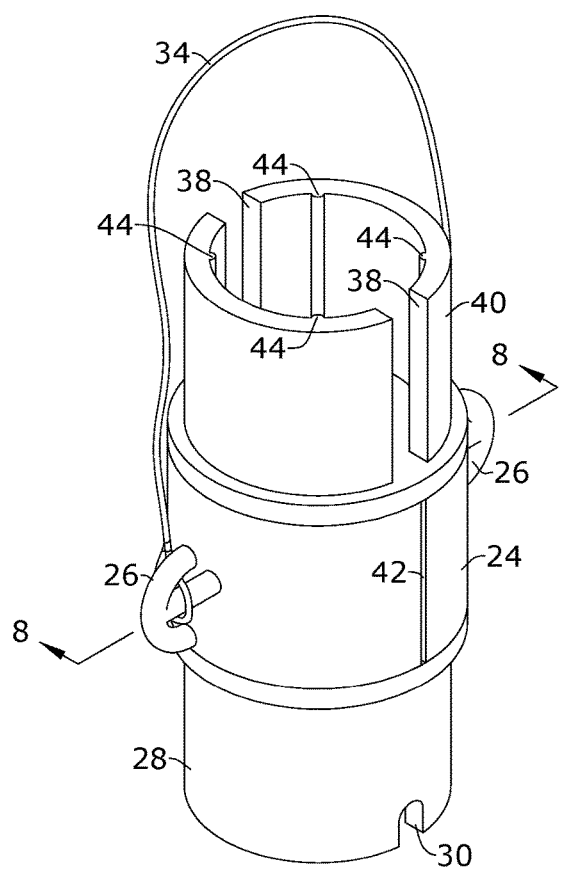
FIG. 4 depicts a perspective view of certain embodiments of the plug apparatus.
Figure 5:
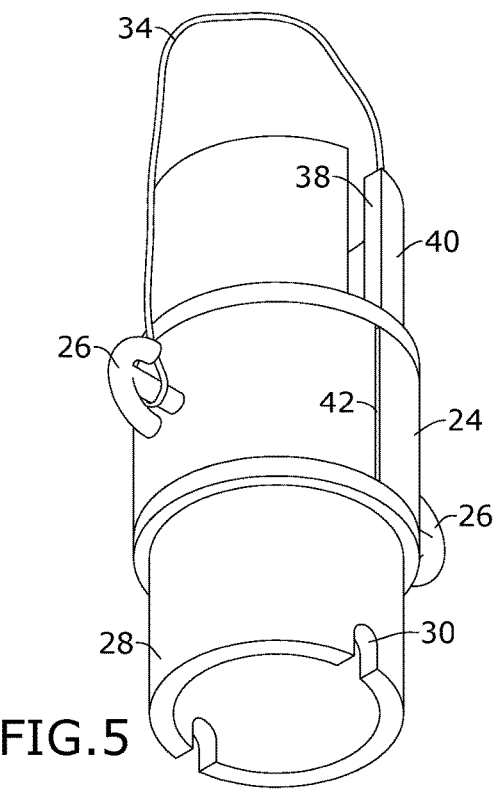
FIG. 5 depicts a perspective view of certain embodiments of the plug apparatus.
Figure 6:
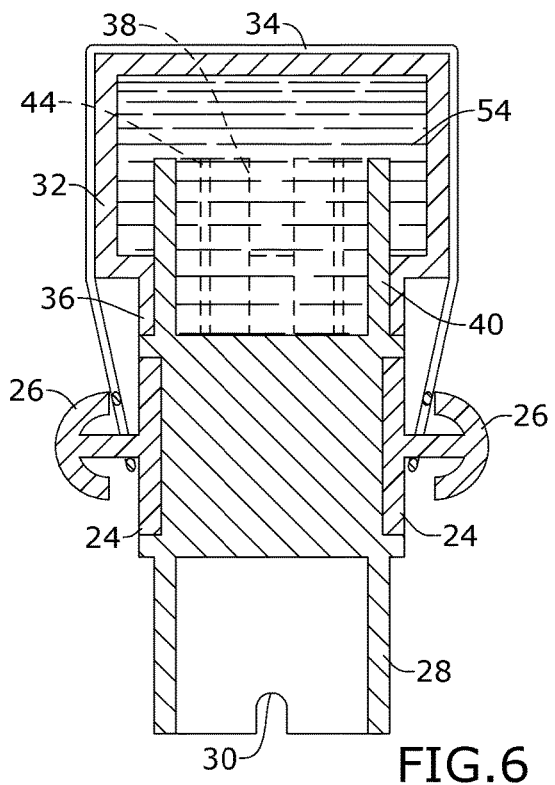
FIG. 6 depicts a section view of certain embodiments of the plug apparatus taken along line 6-6 in FIG. 2.
Figure 7:
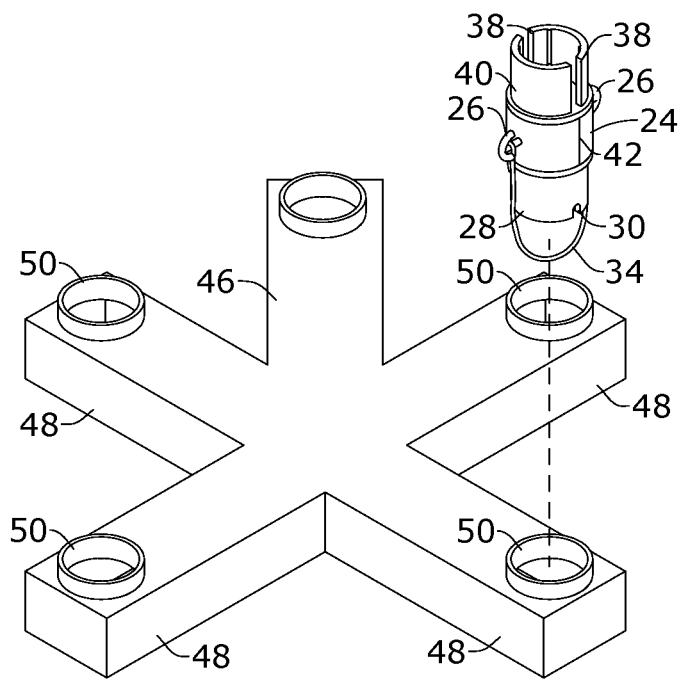
FIG. 7 depicts an exploded view of certain embodiments of the plug apparatus shown in use with the lower manifold of the pool filter system.

In certain embodiments as depicted in FIGS. 2-3, upper manifold 20 of the pool filter system comprises a plurality of upper manifold arms 32. Each upper manifold arm 32 comprises manifold port 36, which is configured to receive plug apparatus 22. Similarly, lower manifold 46 of the pool filter system comprises a plurality of lower manifold arms 48 as depicted in FIG. 7. Each lower manifold arm 48 comprises manifold port 50, which is configured to receive plug apparatus 22. Although FIGS. 2 and 7 depict each manifold in upper and lower manifolds 20, 46 as having five manifold arms 32, 48, it shall be appreciated that upper and lower manifolds 20, 46 may comprise any alternative number of manifold arms and corresponding manifold ports in alternative embodiments.

In certain embodiments as depicted in FIGS. 2-5 and 7, plug apparatus 22 comprises a main body comprising a central body continuously connected to upper Diatomaceous Earth (DE) adapter 40 and lower Diatomaceous Earth (DE) adapter 28, ring 24 and elastic band 34. Plug apparatus 22 preferably is made from any materials including, but not limited to, plastic, rubber, brass, other metals or materials. In certain embodiments, upper Diatomaceous Earth (DE) adapter 40 comprises a tubular member configured to insert within any manifold port 36 in upper manifold 20. Similarly, lower Diatomaceous Earth (DE) adapter 28 comprises a tubular member configured to insert within any manifold port 50 in lower manifold 46.

Upper Diatomaceous Earth (DE) adapter 40 comprises a pair of upper alignment slots 38 disposed entirely through the tubular member and extends longitudinally along the entire length of the adapter. In one embodiment, a plurality of upper alignment ridges 44 are coupled to the interior surface of upper Diatomaceous Earth (DE) adapter 40. Similarly, lower Diatomaceous Earth (DE) adapter 28 comprises a pair of lower alignment slots 30 disposed entirely through the tubular member and extends longitudinally along a portion of the entire length of the adapter.

In one embodiment, ring 24 is rotatably mounted to the central body of plug apparatus 22 and comprises retaining ring slit 42 and a pair of oppositely oriented hooks 26 thereon. Elastic band 34 is a resilient and stretchable material such as rubber comprising a first end loop coupled to first hook 26 and a second end loop coupled to second hook 26.

In certain embodiments as depicted in FIGS. 1-3 and 6, upper Diatomaceous Earth (DE) adapter 40 of plug apparatus 22 is configured to insert into any manifold port 36 in upper manifold 20 corresponding to a damaged filter grid 18 inside upper and lower water filter containers 10, 12. Elastic band 34 comprises a loop that is disposed around upper manifold arm 32 corresponding to the plugged manifold port 36. It shall be appreciated that ring 24 can be rotatably adjusted relative to the central body of plug apparatus 22 to better position elastic band 34 around upper manifold arm 32. Elastic band 34 provides additional tension to ensure upper Diatomaceous Earth (DE) adapter 40 of plug apparatus 22 is tightly secured to manifold port 36 to create a seal. This prevents any water 54 within upper manifold 20 from leaking out of the plugged manifold port 36. In this secured position, the pair of upper alignment slots 38 in upper Diatomaceous Earth (DE) adapter 40 is configured to engage with a corresponding pair of protrusions present on the inner surface of upper manifold 20.

Figure 8:
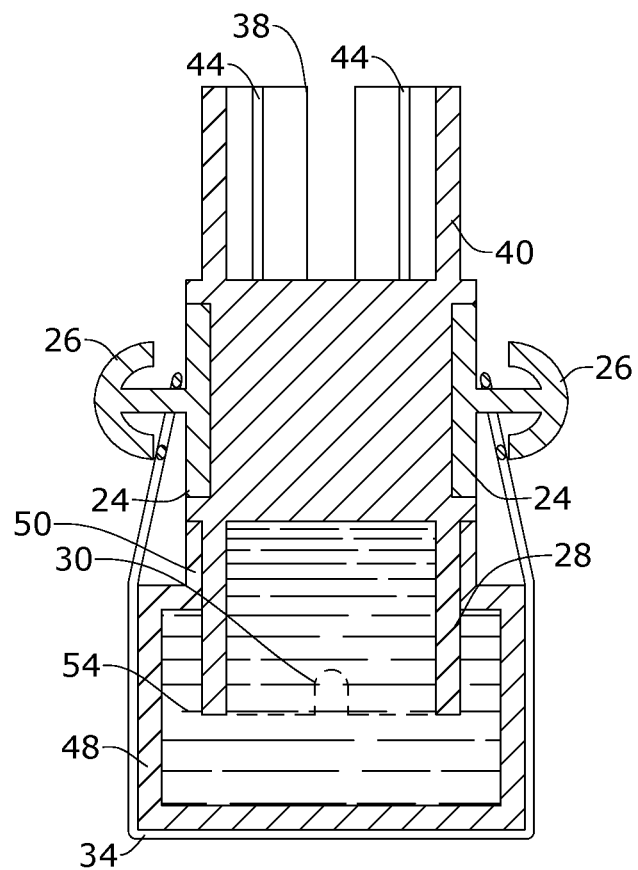
FIG. 8 depicts a section view of certain embodiments of the plug apparatus taken along line 8-8 in FIG. 4.

Similarly, as depicted in FIGS. 7-8, lower Diatomaceous Earth (DE) adapter 28 of plug apparatus 22 is configured to insert into any manifold port 50 in lower manifold 46 corresponding to a damaged filter grid 18 inside upper and lower water filter containers 10, 12. Elastic band 34 comprises a loop that is disposed around lower manifold arm 48 corresponding to the plugged manifold port 50. In this secured position, the pair of lower alignment slots 30 in lower Diatomaceous Earth (DE) adapter 28 is configured to engage with a corresponding pair of protrusions present on the inner surface of lower manifold 46.

Figure 9:
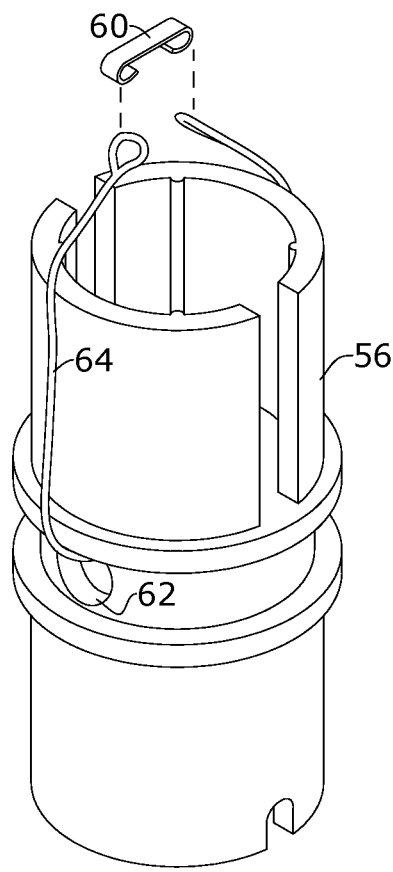
FIG. 9 depicts a first alternate embodiment of certain embodiments of the plug apparatus.
Figure 10:
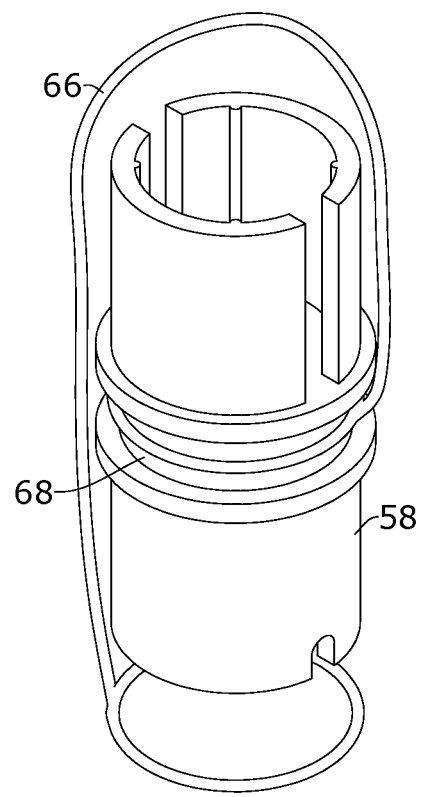
FIG. 10 depicts a second alternate embodiment of certain embodiments of the plug apparatus.

In alternative embodiments as depicted in FIGS. 9-10, alternative fastening components can be used to secure the plug apparatus to upper manifold 20 or lower manifold 46. The function of the plug apparatus remains the same as previously described. As depicted in FIG. 9, first alternate plug apparatus 56 comprises the same components of plug apparatus 22 previously described including at least a main body comprising a central body continuously connected to upper Diatomaceous Earth (DE) adapter 40 and lower Diatomaceous Earth (DE) adapter 28, upper alignment slots 38, upper alignment ridges 44 and lower alignment slots 30.

In one embodiment, first alternate plug apparatus 56 comprises retaining band 64, coupling clip 60, and pass through hole 62 extending entirely through the central body of the main body and oriented perpendicular to the longitudinal axis of first alternate plug apparatus 56. Retaining band 64 extends through pass through hole 62 in the central body so that a first end ring and a second end ring of the band remain outside of first alternate plug apparatus 56.

Retaining band 64 is made from a resilient and stretchable material such as rubber to allow the band to stretch around upper manifold arm 32 or lower manifold arm 48. This allows the first and second end rings of retaining band 64 to couple together using coupling clip 60 to ensure first alternate plug apparatus 56 properly seals the corresponding manifold port 36, 50 in the upper manifold or lower manifold of the pool filter system.

In an alternative embodiment, first alternate plug apparatus 56 can have any alternative number of pass through holes 62 in the main body to vary the positioning of retaining band 64 when disposed therethrough. This allows retaining band 64 to better fit any manifold arms in the upper manifold or lower manifold of the pool filter system.

As depicted in FIG. 10, second alternate plug apparatus 58 comprises the same components of plug apparatus 22 previously described including at least a main body comprising a central body continuously connected to upper Diatomaceous Earth (DE) adapter 40 and lower Diatomaceous Earth (DE) adapter 28, upper alignment slots 38, upper alignment ridges 44 and lower alignment slots 30.

In one embodiment, second alternate plug apparatus 58 comprises middle stop 68 on the central body of the main body and retaining band 66. Retaining band 66 comprises a first end ring disposed around middle stop 68 and a second end ring. Retaining band 66 is made from a resilient and stretchable material such as rubber to allow the band to stretch around upper manifold arm 32 or lower manifold arm 48. The second end ring of retaining band 66 is disposed around any portion of the main body of second alternate plug apparatus 58. This ensures second alternate plug apparatus 58 properly seals the corresponding manifold port 36, 50 in the upper manifold or lower manifold of the pool filter system.

It shall be appreciated that each plug apparatus 22, 56, 58 described in embodiments of the invention is advantageous because it seals any port in the upper manifold or lower manifold of a pool filter system corresponding to a damaged filter grid. This allows the pool filter system to remain functional and operational until the damaged filter grid can be replaced. During use, plug apparatus 22, 56, 58 prevents debris, dirt and/or other items passing through the damaged filter grid from flowing back into the swimming pool basin. It shall be appreciated that any number of plug apparatuses 22, 56, 58 can be used at the same time to plug any corresponding number of manifold ports 36, 50 in upper and lower manifolds 20, 46.

It shall be appreciated that the components of the plug apparatuses described in several embodiments herein may comprise any alternative known materials in the field and be of any color, size and/or dimensions. It shall be appreciated that the components of the plug apparatuses described herein may be manufactured and assembled using any known techniques in the field.

Persons of ordinary skill in the art may appreciate that numerous design configurations may be possible to enjoy the functional benefits of the inventive systems. Thus, given the wide variety of configurations and arrangements of embodiments of the present invention, the scope of the invention is reflected by the breadth of the claims below rather than narrowed by the embodiments described above.

What is claimed is:

1. A temporary plug apparatus for use with an upper manifold or lower manifold of a pool filter system, the plug apparatus configured to seal a port in the upper or lower manifold corresponding to a damaged filter grid in a plurality of filter grids in the pool filter system to permit continued operation of the filter system until the damaged filter grid is replaced, the plug apparatus comprising:
   a main body comprising a central body, an upper generally tubular member coupled to the central body, and a generally lower tubular member coupled to the central body, the upper generally tubular member configured to insert into one of a plurality of ports in the upper manifold, the lower generally tubular member configured to insert into one of a plurality of ports in the lower manifold; and
   an elastic band coupled to the central body of the main body to form a loop in the band; wherein the band is configured to stretch to allow the loop to wrap around the upper manifold or lower manifold of the pool filter system to ensure the upper tubular member or lower tubular member of the main body is secured to the one of the plurality of ports in the upper or lower manifold, wherein the main body comprises a first pair of alignment slots extending along the upper generally tubular member and a second pair of alignment slots extending along the lower generally tubular member, the first pair of alignment slots configured to engage with a pair of protrusions in the upper manifold, the second pair of alignment slots configured to engage with a pair of protrusions in the lower manifold.

2. The temporary plug apparatus of claim 1, wherein the first pair of alignment slots extends longitudinally along an entire length of the upper generally tubular member and the second pair of alignment slots extends longitudinally along a portion of an entire length of the lower generally tubular member.

3. The temporary plug apparatus of claim 2, further comprising a ring rotatably mounted to the central body of the main body, wherein the elastic band is coupled to the ring.

4. The temporary plug apparatus of claim 3, further comprising a pair of hooks coupled to the ring, wherein a first end of the elastic band is directly coupled to the first hook in the pair of hooks and a second end of the elastic band is directly coupled to the second hook in the pair of hooks.

5. The temporary plug apparatus of claim 4, further comprising a plurality of ridges coupled to an interior surface of the upper generally tubular member of the main body.

6. A temporary plug apparatus for use with an upper manifold or lower manifold of a pool filter system, the plug apparatus configured to seal a port in the upper or lower manifold corresponding to a damaged filter grid in a plurality of filter grids in the pool filter system to permit continued operation of the filter system until the damaged filter grid is replaced, the plug apparatus comprising:
   a main body comprising a central body, an upper generally tubular member coupled to the central body, and a generally lower tubular member coupled to the central body, the upper generally tubular member configured to insert into one of a plurality of ports in the upper manifold, the lower generally tubular member configured to insert into one of a plurality of ports in the lower manifold; and
   an elastic band coupled to the main body and comprising a first end with a first ring and a second end with a second ring, the first ring of the elastic band disposed around the central body of the main body; wherein the band is configured to stretch to wrap around the upper manifold or lower manifold of the pool filter system and allow the second ring of the band to dispose around any portion of the main body, thereby securing the upper tubular member or lower tubular member of the main body to the one of the plurality of ports in the upper or lower manifold,
   wherein the main body comprises a first pair of alignment slots extending along the upper generally tubular member and a second pair of alignment slots extending along the lower generally tubular member, the first pair of alignment slots configured to engage with a pair of protrusions in the upper manifold, the second pair of alignment slots configured to engage with a pair of protrusions in the lower manifold.

7. The temporary plug apparatus of claim 6, wherein the first pair of alignment slots extends longitudinally along an entire length of the upper generally tubular member and the second pair of alignment slots extends longitudinally along a portion of an entire length of the lower generally tubular member.

8. A temporary plug apparatus for use with an upper manifold or lower manifold of a pool filter system, the plug apparatus configured to seal a port in the upper or lower manifold corresponding to a damaged filter grid in a plurality of filter grids in the pool filter system to permit continued operation of the filter system until the damaged filter grid is replaced, the plug apparatus comprising:

a main body comprising a central body, an upper generally tubular member coupled to the central body, and a generally lower tubular member coupled to the central body, the upper generally tubular member configured to insert into one of a plurality of ports in the upper manifold, the lower generally tubular member configured to insert into one of a plurality of ports in the lower manifold; and an elastic band coupled to the main body and extending therethrough the central body of the main body so that a first end and a second end of the elastic band remain outside the main body, wherein the band is configured to stretch to wrap around the upper manifold or lower manifold of the pool filter system to allow the first and second ends of the elastic band to couple together by a fastener, thereby securing the upper tubular member or lower tubular member of the main body to the one of the plurality of ports in the upper or lower manifold.

* * * * *